US011593138B2

(12) United States Patent
Chiou et al.

(10) Patent No.: US 11,593,138 B2
(45) Date of Patent: Feb. 28, 2023

(54) SERVER OFFLOAD CARD WITH SOC AND FPGA

(71) Applicant: Microsoft Technology Licensing, LLC, Redmond, WA (US)

(72) Inventors: Derek Chiou, Redmond, WA (US); Andrew Putnam, Redmond, WA (US); Daniel Firestone, Redmond, WA (US); Jack Lavier, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 434 days.

(21) Appl. No.: 16/808,286

(22) Filed: Mar. 3, 2020

(65) Prior Publication Data

US 2020/0371828 A1    Nov. 26, 2020

Related U.S. Application Data (60) Provisional application No. 62/850,421, filed on May 20, 2019.

(51) Int. Cl.
*G06F 9/455* (2018.01)
*G06F 13/42* (2006.01)
*G06F 11/07* (2006.01)

(52) U.S. Cl.
CPC ...... *G06F 9/45558* (2013.01); *G06F 11/0709* (2013.01); *G06F 11/0793* (2013.01); *G06F 13/4282* (2013.01); G06F 2009/45579 (2013.01); G06F 2009/45583 (2013.01); *G06F 2009/45595* (2013.01); G06F 2213/0026 (2013.01)

(58) Field of Classification Search
CPC ............. G06F 9/45558; G06F 11/0709; G06F 11/0793; G06F 13/4282; G06F 2009/45579; G06F 2009/45583; G06F 2009/45595; G06F 2213/0026
USPC ....................................................... 714/4.11
See application file for complete search history.

(56) References Cited

U.S. PATENT DOCUMENTS

| 10,747,883 B2* | 8/2020 | Packer Ali ............ H04L 9/0643 |
| 2016/0232019 A1* | 8/2016 | Shah ................... G06F 9/45558 |
| 2018/0330095 A1* | 11/2018 | Packer Ali ............ H04L 9/3247 |

OTHER PUBLICATIONS

Mouser electronics "Altera / Intel SoC FPGA Family" page, retrieved from https://www.mouser.com/new/intel/altera-socFPGA/ (Year: 2022).*
"Intel Arria 10 Device Overview", Retrieved from: https://www.intel.com/content/dam/www/programmable/us/en/pdfs/literature/hb/arria-10/a10_overview.pdf, Dec. 6, 2018, 43 Pages.

(Continued)

*Primary Examiner* — Yair Leibovich
(74) *Attorney, Agent, or Firm* — Fountainhead Law Group PC (57) ABSTRACT

A physical server with an offload card including a SoC (system-on-chip) and a FPGA (field programmable gate array) is disclosed. According to one set of embodiments, the SoC can be configured to offload one or more hypervisor functions from a CPU complex of the server that are suited for execution in software, and the FPGA can be configured to offload one or more hypervisor functions from the CPU complex that are suited for execution in hardware.

20 Claims, 4 Drawing Sheets

(56) References Cited

OTHER PUBLICATIONS

Firestone, et al., "Azure Accelerated Networking: SmartNICs in the Public Cloud", In Proceedings of the 15th USENIX Symposium on Networked Systems Design and Implementation, Apr. 9, 2018, pp. 51-64.
"International Search Report and Written Opinion Issued in PCT Application No. PCT/US20/028603", dated Jul. 16, 2020, 15 Pages.
Walls, Colin, "Embedded Systems and Programmable logic", In book of Embedded Software: The Work, Elsevier Science & Technology, Oct. 18, 2005, pp. 355-376.

* cited by examiner

SERVER OFFLOAD CARD WITH SOC AND FPGA

CROSS-REFERENCES TO RELATED APPLICATIONS

The present application claims the benefit and priority of U.S. Provisional Application No. 62/850,421, filed May 20, 2019, entitled "SERVER OFFLOAD CARD WITH SOC AND FPGA." The entire contents of this provisional application are incorporated herein by reference for all purposes.

BACKGROUND

Cloud platforms such as Microsoft Azure and Amazon AWS run on a large fleet of physical servers (referred to herein as cloud servers) that are distributed across geographically dispersed data centers. A significant portion of these cloud servers implement a virtualization software layer, known as a hypervisor, that allows for the hosting of virtual machines (VMs). Among other things, this enables IaaS (Infrastructure-as-a-Service) scenarios where customers of the cloud platform can purchase and use VMs to execute their application workloads.

Traditionally, in each cloud server that implements a hypervisor, a certain percentage of the cloud server's CPU (central processing unit) cores will be reserved for hypervisor use. While this reservation ensures that the hypervisor has sufficient compute resources to carry out its functions, it also reduces the number of CPU cores available for use by, e.g., customer VMs. At scale, this can result in a meaningful reduction in the overall customer-facing compute capacity of the cloud platform.

SUMMARY

A physical server with an offload system including a SoC (system-on-chip) and a FPGA (field programmable gate array) is disclosed. One possible embodiment of the offload system is on a card. According to one set of embodiments, the SoC can be configured to offload one or more hypervisor functions from a CPU complex of the server that are suited for execution in software, and the FPGA can be configured to offload one or more hypervisor functions from the CPU complex that are suited for execution in hardware.

DETAILED DESCRIPTION

In the following description, for purposes of explanation, numerous examples and details are set forth to provide an understanding of various embodiments. It will be evident, however, to one skilled in the art that certain embodiments can be practiced without some of these details or can be practiced with modifications or equivalents thereof

1. Overview

Embodiments of the present disclosure are directed to a physical server design that employs an offload card comprising a SoC (system-on-chip) and a FPGA (field-programmable gate array). In various embodiments, the SoC and FPGA can run hypervisor functions traditionally executed by the server's CPU complex, thereby offloading the processing burden for those functions from the CPU complex. For example, the SoC of the offload card can run hypervisor functions that require or benefit from the flexibility of a general purpose processor (e.g., networking and storage control plane functions), while the FPGA of the offload card can run hypervisor functions that are suited for implementation/acceleration in hardware (e.g., networking and storage data plane functions).

With this general architecture, it is possible to move most, if not all, hypervisor processing from the server's CPU complex to the offload card, which advantageously allows the CPU complex to focus on running tenant (e.g., customer) VM workloads. In cases where the hypervisor is completely vacated from the CPU complex, tenant code can potentially run in a "bare metal" manner on the CPU complex (i.e., without any intervening hypervisor virtualization layer).

Further, because the execution of hypervisor code/logic on the offload card is physically isolated from the execution of tenant code on the CPU complex, this solution protects the hypervisor from side-channel attacks that may attempt to use the tenant code as an attack vector.

Yet further, by employing an FPGA for accelerating certain hypervisor functions that are amenable to hardware implementation, the offload card can improve the server's efficiency while at the same time maintaining architectural flexibility. For example, if needed, the FPGA can be reprogrammed from accelerating one type/class of functions (e.g., networking) to accelerating another type/class of functions (e.g., storage). This is not possible with a hard logic-based accelerator such as an ASIC (application-specific integrated circuit).

The foregoing and other aspects of the present disclosure are described in further detail in the sections that follow.

2. Server Topology

Figure 1:
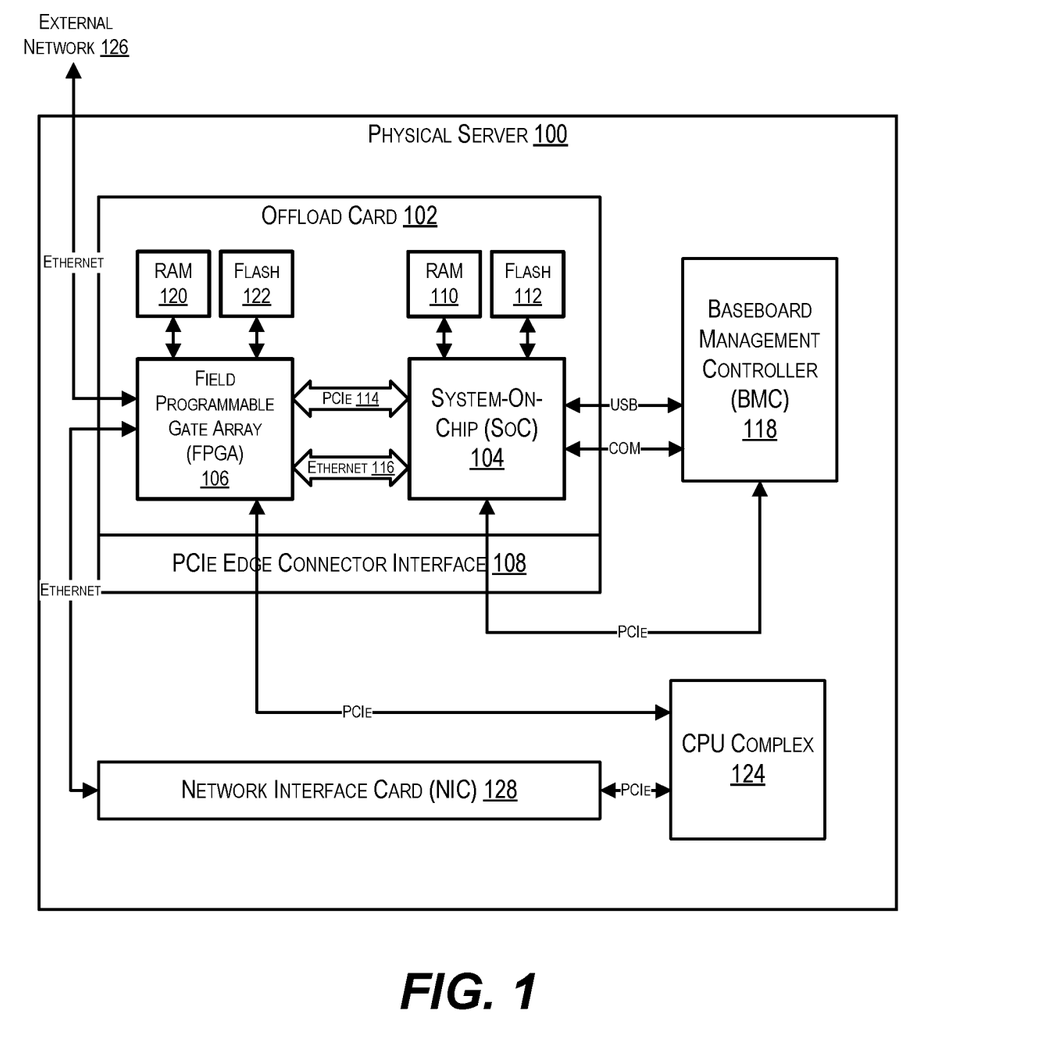
FIG. 1 depicts a physical server topology that includes an offload card with a SoC and a FPGA according to certain embodiments.

FIG. 1 is a simplified block diagram illustrating the high-level topology of a physical server 100 according to certain embodiments of the present disclosure. In one set of embodiments, physical server 100 may be a cloud server that is deployed as part of the infrastructure of a cloud platform. In these embodiments, physical server 100 may be mounted in a server rack within a data center operated by the cloud platform provider. In other embodiments, physical server 100 may be deployed in other contexts and/or via other form factors, such as in an on-premises enterprise IT environment in the form of, e.g., a standalone server.

As noted in the Background section, cloud servers often implement a hypervisor for virtualization, which allows the cloud platform to offer services such as IaaS (Infrastructure-as-a-Service). However, due to using a portion of their platform resources, including CPU cores, for hypervisor (also known as "host") use, conventional cloud servers cannot expose all of their CPU capacity to VMs, thereby reducing the efficiency of the platform.

To address this and other issues, physical server 100 includes a novel offload card 102 comprising a SoC 104 and a FPGA 106. In the embodiment shown, offload card 102 is implemented as a PCIe (Peripheral Component Interface Express)-based expansion card and thus interfaces with the mainboard of physical server 100 via a standard PCIe x16

3.0 edge connector interface 108. In other embodiments, offload card 102 may be implemented using any other type of peripheral interface.

As shown, SoC 104 has its own RAM (random access memory) 110 and flash memory 112 and is communicatively coupled with FPGA 106 via at least interface that is internal to offload card 102: a PCIe interface 114 and an Ethernet interface 116. In addition, SoC 104 is communicatively coupled with a baseboard management controller (BMC) 118 of physical server 100 through I2C interface 108 and a number of other channels (e.g., USB and COM).

FPGA 106 also has its own RAM 120 and flash memory 122 and is communicatively coupled with a CPU complex 124 of physical server 100 through PCIe edge connector interface 108. This CPU complex comprises the main CPU cores and associated RAM modules of physical server 100. In addition, FPGA 106 includes two external Ethernet interfaces, one of which connects to an external network 126 (via, e.g., a TOR (top-of-rack) switch or some other network device) and the other of which connects to a NIC (network interface card/controller) 128 within physical server 100.

Generally speaking, the topology shown in FIG. 1 enables some or all of the hypervisor functions traditionally run on CPU complex 124 of physical server 100 to instead be run on, and thus offloaded to, SoC 104 and FPGA 106 of offload card 102. For example, hypervisor functions that benefit from the flexibility of a general purpose processor (or are simply too complex/dynamic to implement in hardware) can be run on SoC 104, which incorporates one or more general purpose processing cores. Examples of such functions include SDN (software-defined networking) control plane functions, which require complex routing computations and need to be updated relatively frequently to support new protocols and features.

On the other hand, hypervisor functions that are suited to hardware acceleration can be implemented via logic blocks on FPGA 106. Examples of such functions include SDN data plane functions, which involve forwarding network data traffic according to control plane decisions, and storage data plane functions such as data replication, de-duplication, and so on.

With this solution, a number of advantages are achieved over conventional server designs. First, by relieving CPU complex 124 of certain host processing duties, the amount of platform resources, including CPU cores in CPU complex 124, used by the hypervisor can be decreased, which in turn increases the platform capacity available to VMs (also known as "guests"). This is particularly beneficial in public cloud platforms where every incremental increase in server efficiency can have a significant impact at scale. In some embodiments, the hypervisor may be entirely vacated from CPU complex 124 and moved to offload card 102, in which case CPU complex 124 can run a minimal hypervisor that deals with issues that can only be run on the CPU complex itself, such as accessing certain registers, or no hypervisor at all and the remainder of the compute capacity of CPU complex 124 can be dedicated to guest workloads.

Second, by implementing both SoC 104 (which handles non-hardware accelerated functions) and FPGA 106 (which handles hardware accelerated functions) on offload card 102 and tightly coupling these two, it is easier for the hypervisor code running on SoC 104 to interact with the logic implemented in FPGA 106 and vice versa. It is possible to have alternative implementations that solely include a hardware accelerator on offload card 102, but these implementations require data flows for properly coordinating the activities of the hardware accelerator with the server's main CPUs. Additionally, these alternative implementations may not support "bare metal" platforms and may not offload as much of the work.

Third, because the host code running on offload card 102 is physically isolated from guest code running on CPU complex 124, it is more difficult for malicious entities to perpetrate an attack on the hypervisor via the VMs. This particularly relevant in light of the recent discoveries of certain side-channel vulnerabilities in modern CPU architectures. Although these known vulnerabilities can be patched, other similar vulnerabilities may be found in the future.

Fourth, by using a FPGA rather than an ASIC for hardware acceleration, offload card 102 can be easily re-purposed for different use cases or the same use case improved by re-programming the FPGA, and the FPGA logic can be updated if needed. This is advantageous in large-scale deployments where it may not be desirable to pull and replace a large number cards that are already in the field.

It should be appreciated that the specific topology shown for physical server 100 in FIG. 1 is illustrative and various modifications are possible. For example, although SoC 104 and FPGA 106 are shown as being implemented on an expansion card (i.e., offload card 102) that interfaces with the physical server's mainboard via a peripheral (e.g., PCIe) interface, in some embodiments an alternative offload architecture may be used. In a particular embodiment, one or more of SoC 104 and/or FPGA 106 may be implemented directly on the server mainboard.

As another example, although NIC 128 is depicted as being a standalone component, in some embodiments the functionality of NIC 128 may be incorporated into one or more other components shown in FIG. 1, such as in FPGA 106. One of ordinary skill in the art will recognize other variations, modifications, and alternatives.

3. Offload Card Architecture

Figure 2:
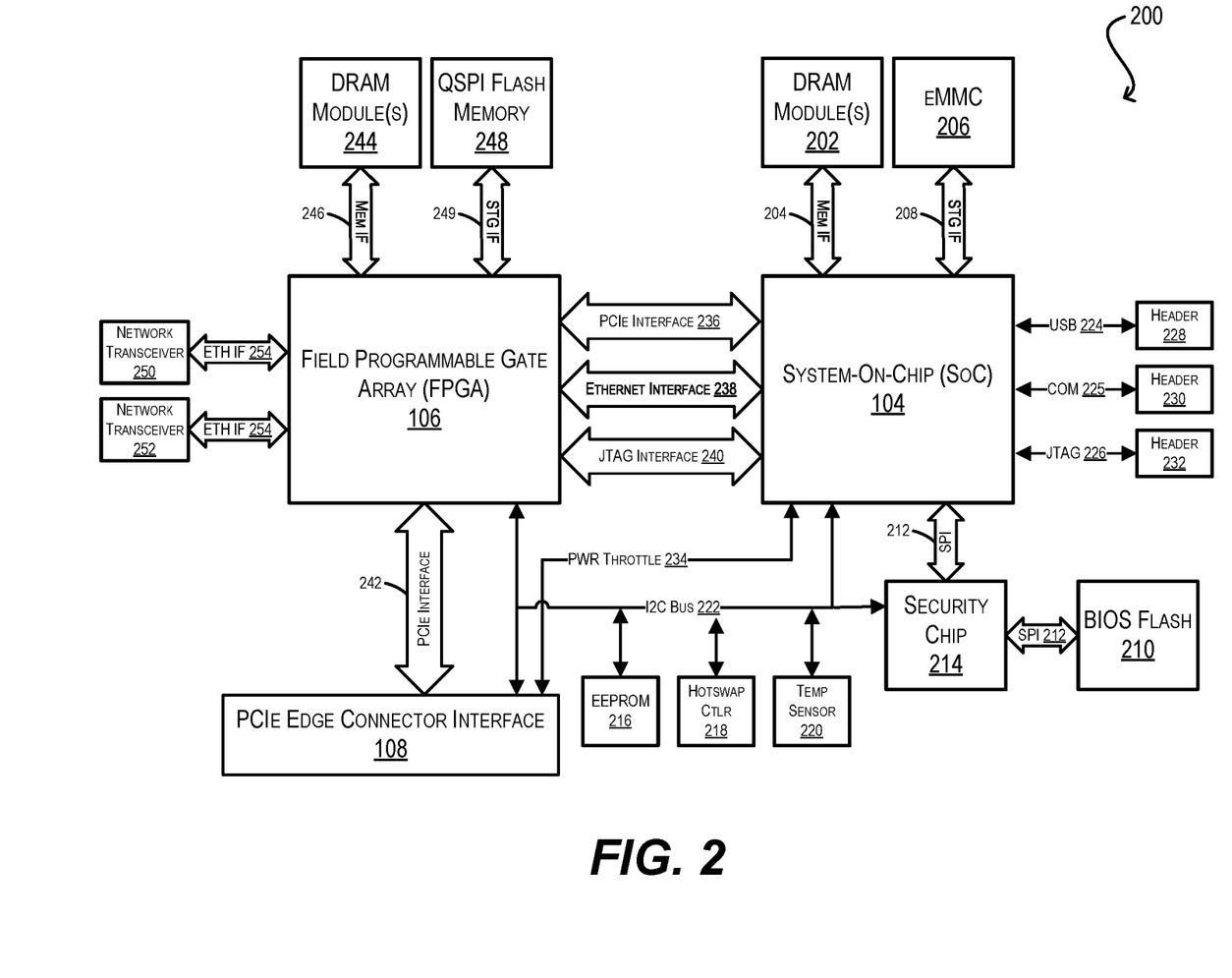
FIG. 2 depicts an architecture for the offload card of FIG. 1 according to certain embodiments.

FIG. 2 is a schematic diagram 200 that presents additional details regarding the architecture of offload card 102 of FIG. 1 according to certain embodiments. Various aspects of this architecture are discussed in turn below.

3.1 SoC

SoC 104 can be implemented using any one of a number of existing system-on-chip designs that include one or more general purpose processing cores, interfaces for memory, storage, and peripherals, and a NIC. In a particular embodiment, SoC 104 may incorporate general purpose processing cores based on the ARM microprocessor architecture.

As shown, SoC 104 is communicatively coupled with FPGA 106 via three separate interfaces, which are discussed in section 3.2 below. In addition, SoC is connected to (1) one or more DRAM (dynamic RAM) modules 202 corresponding to RAM 110 of FIG. 1 via a memory interface 204, (2) an eMMC (embedded multimedia card) device 206 corresponding to flash memory 112 of FIG. 1 via a storage interface 208, (3) a BIOS flash memory component 210 via SPI (Serial Peripheral Interface) interfaces 212 and an intervening security chip 214, and (4) a number of I2C (Inter Integrated Device) devices such as EEPROM 216, hotswap controller 218, and temperature sensor 220 via an I2C bus 222 (which is also connects to FPGA 106 and PCIe edge connector interface 108).

Regarding (1), SoC 104 can use DRAM module(s) 202 as its working memory for running program code, including hypervisor code offloaded from CPU complex 124 of physical server 100. The specific number and capacity of DRAM module(s) 202 and the specification of memory interface 204 can vary depending on the implementation. In a particular embodiment, DRAM module(s) 202 can comprise 8 GB (gigabytes) of DDR4 DRAM organized as a single 1024M (megabit)×64 bit+ECC (error correction code) memory bank and memory interface 204 can be configured as a single DDR4-2400 memory channel.

Regarding (2), SoC 104 can use eMMC device 204 as a non-transitory storage medium for storing and booting program code to be executed on the SoC, including hypervisor code offloaded from CPU complex 124, as well as storing FPGA configuration images to be applied to FPGA 106.

Regarding (3), BIOS flash memory component 210 can hold the system firmware for SoC 104 and security chip 214 can, among other things, ensure that this system firmware is not purposefully or inadvertently modified or corrupted by an attacker.

Regarding (4), I2C devices 216, 218, and 220 can provide various pieces of management information regarding offload card 102 to BMC 118. These pieces of information can include information such as operating temperature data, manufacturing information, and power consumption data.

In addition to the above, SoC 104 includes USB (Universal Serial Bus), COM, and JTAG (Joint Test Action Group) interfaces 224, 225, and 226 to external headers 228, 230, and 232 respectively, which can be used to connect SoC 104 with BMC 118 or external devices for debugging or management. There is also a power throttle signal 234 that can be sent by BMC 118 to SoC 104 through PCIe edge connector interface 108.

3.2 Interfaces Between SoC and FPGA

As mentioned previously, SoC 104 is communicatively coupled with FPGA 106 via three internal, chip-to-chip interfaces in FIG. 2: a PCIe interface 236, an Ethernet interface 238, and a JTAG interface 240. In various embodiments, PCIe interface 236 provides both control and data transfer/exchange capabilities. For control capabilities, SoC 104 can use PCIe interface 236 (or alternatively a JTAG interface) to manage and update FPGA 106. For example, SoC 104 can validate FPGA configuration images transferred from RAM 110 to FPGA 106 and can update the image on the FPGA or in the FPGA's flash memory 122 using this interface. For data capabilities, PCIe interface 236 can enable program code running on SoC 104 to send data to, and receive data from, FPGA 104. This is useful for, e.g., hypervisor code that is already written to exchange data over PCIe, because such code can be ported for execution on SoC 104 (or implementation on FPGA 106) with relatively few changes. In a particular embodiment, PCIe interface 236 can have 8 PCI 3.0 lanes (i.e., correspond to a PCI 3.0 8x interface). In other embodiments any other number of PCI lanes, such as 4, 12, 16, etc., may be supported.

Ethernet interface 238 allows SoC 104 and FPGA 106 to exchange data in the form of network packets. This is useful for, e.g., hypervisor code that is already written to exchange data via network packets, because such code can be ported for execution on SoC 104 (or implementation on FPGA 106) with relatively few changes. For example, consider a scenario where network flow-based forwarding is implemented in hardware on FPGA 106 and a network control plane for determining routes for network flows is implemented in software on SoC 104. In this case, flow table exceptions and rules can be communicated between FPGA 106 and SoC 104 in the form of network packets. In a particular embodiment, Ethernet interface 238 can support 25G (gigabit) Ethernet.

Figure 3:
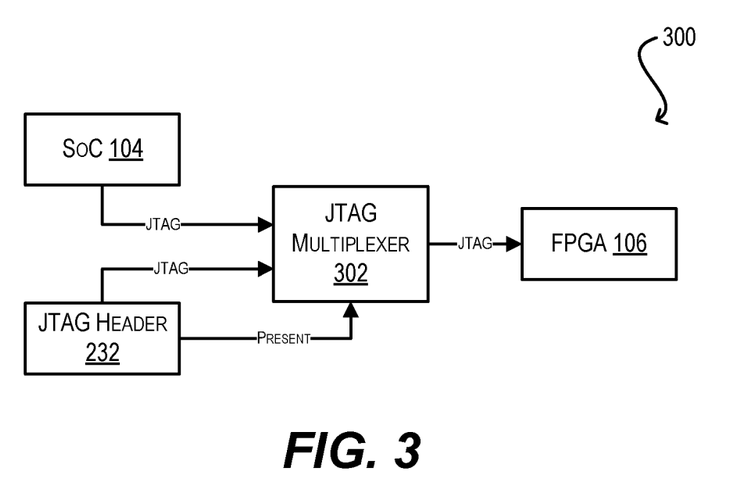
FIG. 3 depicts a JTAG (Joint Test Action Group) multiplexer implementation according to certain embodiments.

JTAG interface 240 provides a way for SoC 104 to communicate with FPGA 106 for low-level testing (e.g., debugging) and programming purposes. In some embodiments, a JTAG multiplexer can be inserted in the JTAG path between SoC 104 and FPGA 106 that allows an external programmer device connected via external header 232 to drive interface 240. In these embodiments, a "present" signal from the external programmer device will switch the signal path of JTAG interface 240 from SoC 104 to the device. This is useful for initial offload card bring-up when loading initial bit streams, and for FPGA application development when the SoC to FPGA JTAG path is not ready. FIG. 3 depicts an example diagram 300 of this architecture with a JTAG multiplexer 302 according to certain embodiments.

3.3 FPGA

FPGA 106 can be implemented using any one of number of existing FPGA chips. In a particular embodiment, FPGA 106 can be implemented using an existing FPGA chip that supports a certain minimum number of programmable logic elements (e.g., 1000K elements) and a certain minimum transceiver/FPGA fabric speed grade (e.g., grade 2). As shown in FIG. 2, FPGA 106 is communicatively coupled with I2C bus 222 and with SoC 104 via interfaces 236-240 discussed above. In addition, FPGA 106 is connected to (1) PCIe edge connector interface 108 via internal PCIe interface 242, (2) one or more DRAM module(s) 244 corresponding to RAM 120 of FIG. 1 via a memory interface 246, (3) a QSPI (Quad Serial Peripheral Interface) flash memory module 248 corresponding to flash memory 122 of FIG. 1 via a storage interface 249, and (4) two network transceiver modules 250 and 252 via Ethernet interfaces 254 and 256 respectively.

Regarding (1), internal PCIe interface 242 enables FPGA 106 to communicate with CPU complex 124 and other PCIe devices installed in physical server 100 (including, e.g., NIC 128). In a particular embodiment, PCIe interface 242 may be a PCIe 3.0 x16 interface.

Regarding (2), FPGA 106 can use DRAM module(s) 244 as its working memory when executing logic programmed into the device, including hypervisor logic offloaded from CPU complex 124. The specific number and capacity of DRAM module(s) 244 and the specification of memory interface 246 can vary depending on the implementation. In a particular embodiment, DRAM module(s) 202 can comprise 8 GB (gigabytes) of DDR4 DRAM organized as two 4 GB banks of 512M×64 bit+ECC and memory interface 246 can be configured as dual DDR4-2400 memory channels.

Regarding (3), QSPI flash memory module 248 can hold one or more FPGA configuration images that FPGA 106 can load upon power-up into order to configure itself to perform its designated functions. In certain embodiments, QSPI flash memory module 248 can hold at least three separate images, which is described in section 3.4 below. In addition to configuration from flash memory, FPGA 106 can also support configuration via an external JTAG programmer device, JTAG commands sent by SoC 104 over JTAG interface 240, CvP (Configuration via Protocol) over PCIe, and partial reconfiguration over PCIe.

Regarding (4), network transceiver module 250 enables FPGA 106 to receive incoming network traffic from and transmit outgoing network traffic to external network 126. Further, network transceiver module 252 enables FPGA 106 to exchange network traffic with NIC 128. This is useful in scenarios where FPGA 106 implements network plane functions because FPGA 106 can receive outgoing network packets from NIC 128 via module 252, process/transform them appropriately, and send them out to external network 126 via module 250. Conversely, FPGA 106 can receive incoming network packets from external network 126 via module 250, process/transform them appropriately, and send them to NIC 128 via module 252 (at which point they can be communicated to the correct destination VM). An example network data flow that leverages FPGA 106 for network data plane acceleration in this manner is discussed in section 4 below. In a particular embodiment, network transceiver modules 250 and 252 can be QSFP28 optical modules and Ethernet interfaces 254 and 256 can support 100G Ethernet.

3.4 FPGA Flash Configuration Specifics

In one set of embodiments, QSPI flash memory module 248 can store a minimum of three separate configuration images for FPGA 106: a golden image, a failsafe image, and a user application image. The golden image is factory tested at the time of initial manufacturing and comprises the normal intended functionality for FPGA 106. The failsafe image is programmed at the factory and is never overwritten after manufacturing. In various embodiments, this failsafe image contains a minimum set of functions required by offload card 102 at power-up and the network interfaces of FPGA 106 are forced into a bypass mode where all traffic is passed directly between the interfaces without any intermediate processing by the FPGA. Finally, the user application image is an image that has been defined by a user/customer.

At the time offload card 102 is powered-on, by default the golden image will be loaded from QSPI flash memory module 248 and applied to FPGA 106 for configuring its structures. If there any errors with this power-on process (or if problems are found during server runtime), the card can be rebooted to load the failsafe image instead of the golden image.

4. Example Network Processing Workflow

Figure 4:
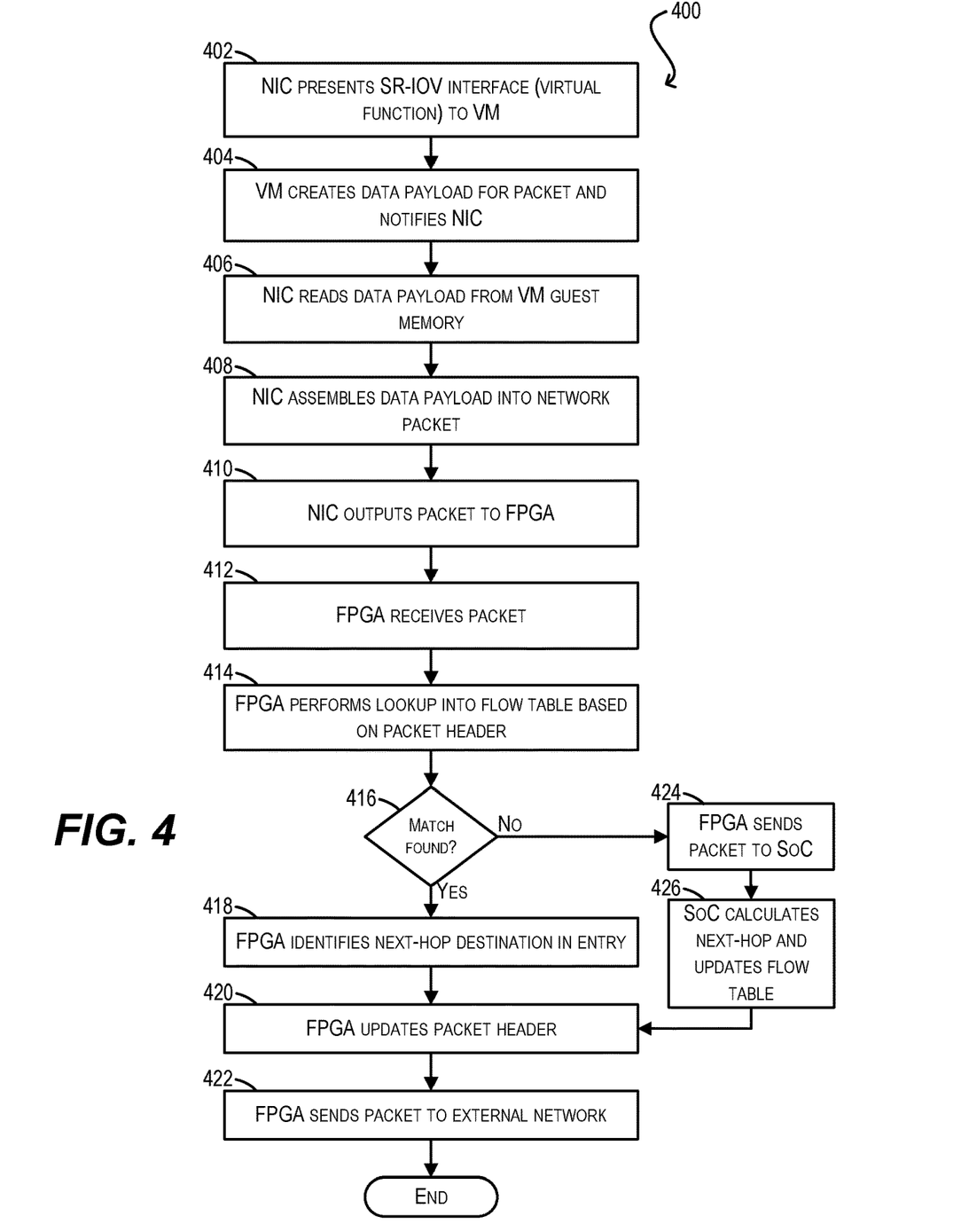
FIG. 4 depicts an example network processing flow according to certain embodiments.

With the foregoing offload card architecture in mind, FIG. 4 depicts a flowchart 400 of an example network processing workflow that may be implemented by physical server 100 according to certain embodiments. Flowchart 400 assumes that FPGA 106 of offload card 106 is configured to maintain a flow table comprising network flows determined by a network control plane running on SoC 104 and to forward data packets in accordance with the flow table.

Starting with block 402, NIC 128 of physical server 100 can present an SR-IOV (single root IO virtualization) interface to a VM running on server 100. This SR-IOV interface (referred to as a virtual function) enables the VM to directly communicate with NIC 128, without involving the hypervisor.

At block 404, the VM can create a data payload for a network packet to be transmitted to a remote destination and can notify NIC 128 of this. In response, NIC 128 can read the data payload from the guest memory space of the VM (block 406), assemble the data payload into one or more network packets with headers identifying, among other things, the IP address of the VM and the IP address of the intended destination (block 408), and output the network packet out of its egress port connected to network transceiver module 252 of FPGA 106 (block 410).

At blocks 412 and 414, FPGA 106 can receive the network packet and apply its network data plane logic to perform a lookup of the network packet's 5-tuple (source IP address, source port, destination IP address, destination port, protocol) into a flow table. If a matching entry is found in the table (block 416), FPGA 106 can identify the next-hop destination for the network packet in the entry (block 418), update the header of the packet (block 420), and send the packet out of network transceiver module 250 to external network 126 (block 422), thereby ending the workflow.

On the other hand, if a matching entry is not found in the table at block 416 (indicating that this is the first packet in a flow), FPGA 106 can send the network packet to SoC 104 over internal Ethernet interface 238 (block 424). A network control plane component running on SoC 104 can then calculate a next-hop destination for the packet and add a new entry for the packet's network flow to the FPGA's flow table via interface 238 (block 426). Using this new entry, FPGA 106 can execute blocks 420 and 422 and the workflow can end.

The above description illustrates various embodiments of the present disclosure along with examples of how aspects of these embodiments may be implemented. The above examples and embodiments should not be deemed to be the only embodiments, and are presented to illustrate the flexibility and advantages of the present disclosure as defined by the following claims. For example, although certain embodiments have been described with respect to particular process flows and steps, it should be apparent to those skilled in the art that the scope of the present disclosure is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the present disclosure as set forth in the following claims.

What is claimed is:

1. A server comprising:
   a CPU (central processing unit) complex; and
   an offload card including:
      an SoC (system-on-chip); and
      an FPGA (field programmable gate array) external and coupled to the SoC,
   wherein the CPU complex is configured to execute one or more virtual machines (VMs),
   wherein the SoC is configured to execute, in software, one or more first functions of a hypervisor associated with the one or more VMs, and
   wherein the FPGA is configured to execute, in hardware, one or more second functions of the hypervisor associated with the one or more VMs.

2. A server comprising:
   a CPU (central processing unit) complex configured to execute one or more virtual machines (VMs); and
   an offload card including:
      means for executing, in software, one or more first functions of a hypervisor associated with the one or more VMs; and
      means for executing, in hardware, one or more second functions of the hypervisor associated with the one or more VMs.

3. A method comprising:
   receiving, by a FPGA (field programmable gate array) residing on an offload card of a server, a network packet from a NIC (network interface card) of the server, wherein the network packet is received via an Ethernet interface interconnecting the FPGA and the NIC;
   performing, by the FPGA in hardware, a lookup into a flow table based on a header of the network packet;

upon determining that no matching entry is found in the flow table for the header, forwarding, by the FPGA, the network packet to a SoC (system-on-chip) residing on the offload card, wherein the network packet is forwarded via an Ethernet interface interconnecting the FPGA and the SoC;

calculating, by the SoC in software, a next-hop destination for the network packet; and updating, by the SoC in software, the flow table with a new flow entry including the next-hop destination.

4. The method of claim 3 further comprising, upon determining that a matching entry is found in the flow table:

updating, by the FPGA, the network packet based on the matching entry; and transmitting, by the FPGA, the network packet to an external network via an external network interface of the FPGA.

5. The server of claim 1 wherein the SoC and the FPGA are communicatively coupled with each other via a PCIe (Peripheral Component Interconnect Express) interface that is internal to the offload card and via an Ethernet interface that is internal to the offload card.

6. The server of claim 5 wherein the SoC and the FPGA are further communicatively coupled with each other via a JTAG (Joint Test Action Group) interface that is internal to the offload card.

7. The server of claim 1 wherein the offload card is inserted into a mainboard of the server via a PCIe edge connector interface.

8. The server of claim 7 wherein the SoC is communicatively coupled with a baseboard management controller (BMC) of the server through the PCIe edge connector interface.

9. The server of claim 7 wherein the FPGA is communicatively coupled with the CPU complex through the PCIe edge connector interface.

10. The server of claim 1 wherein the SoC is communicatively coupled with one or more volatile memory modules resident on the offload card, the one or more volatile memory modules acting as a working memory from which the SoC can execute the one or more first functions.

11. The server of claim 1 wherein the SoC is communicatively coupled with a flash memory module resident on the offload card, the flash memory module storing program code for the one or more first functions.

12. The server of claim 1 wherein the FPGA is communicatively coupled with one or more volatile memory modules resident on the offload card, the one or more volatile memory modules acting as a working memory for the FPGA at a time of executing the one or more second functions.

13. The server of claim 1 wherein the FPGA is communicatively coupled with a flash memory module resident on the offload card, the flash memory module storing at least one configuration image for configuring the FPGA to execute the one or more second functions.

14. The server of claim 13 wherein the flash memory module stores a first configuration image corresponding to a normal operating configuration for the FPGA and a second configuration image corresponding to a failsafe operating configuration for the FPGA.

15. The server of claim 14 wherein the first configuration image is applied to the FPGA by default upon power-on of the offload card.

16. The server of claim 15 wherein the second configuration image is applied to the FPGA if an error occurs while applying the first configuration image.

17. The server of claim 1 wherein the FPGA includes a first external network interface communicatively coupled with a TOR (top-of-rack) network switch and a second external network interface communicatively coupled with a NIC (network interface card) of the server.

18. The server of claim 1 wherein the SoC is communicatively coupled with a BIOS (Basic Input/Output) flash component residing on the offload card via a security chip, the security chip being configured to verify integrity of firmware stored on the BIOS flash component.

19. The server of claim 1 wherein the one or more first functions include network control plane functions or storage control plane functions.

20. The server of claim 1 wherein the one or more second functions include network data plane functions or storage data plane functions.

* * * * *